(12) United States Patent
Tsuchimichi

(10) Patent No.: US 7,852,443 B2
(45) Date of Patent: Dec. 14, 2010

(54) DISPLAY DEVICE AND METHOD HAVING PIXEL AND TERMINAL PARTS WHERE AN ORGANIC RESIN FILM DISPOSED THEREON HAS A FILM THICKNESS ADJUSTING AREA SO THAT THE TERMINAL PART FILM THICKNESS IS THINNER THAN THE PIXEL PART FILM THICKNESS

(75) Inventor: Junichi Tsuchimichi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 12/116,413

(22) Filed: May 7, 2008

(65) Prior Publication Data

US 2008/0278666 A1 Nov. 13, 2008

(30) Foreign Application Priority Data

May 11, 2007 (JP) .............................. 2007-126475

(51) Int. Cl.
*G02F 1/1333* (2006.01)
(52) U.S. Cl. ..................... 349/138; 349/114; 349/149; 349/152
(58) Field of Classification Search ................. 349/114, 349/138, 122, 142–152
See application file for complete search history.

(56) References Cited

U.S. PATENT DOCUMENTS 7,193,679 B2 * 3/2007 Sakamoto et al. ........... 349/187
7,230,668 B2 * 6/2007 Lee et al. .................... 349/152
2001/0013502 A1 8/2001 Nohara et al.
2002/0001048 A1 1/2002 Lee et al.

FOREIGN PATENT DOCUMENTS

| CN | 1609689 A | 4/2005 |
|---|---|---|
| CN | 1819217 A | 8/2006 |
| JP | 11-133627 | 5/1999 |
| JP | 2000-147534 | 5/2000 |
| JP | 2001-305515 | 10/2001 |
| JP | 2003-318402 | 11/2003 |
| JP | 2005-121908 | 5/2005 |
| JP | 2006-208881 | 8/2006 |
| JP | 2006208881 A * | 8/2006 |

* cited by examiner

*Primary Examiner*—John Heyman
(74) *Attorney, Agent, or Firm*—Oblon, Spivak, McClelland, Maier & Neustadt, L.L.P.

(57) ABSTRACT

A display device of the present invention includes a first insulation film formed on a first auxiliary capacitance electrode, a second auxiliary capacitance electrode, a first gate electrode wiring, and a second gate electrode wiring formed on a substrate. A source electrode, a drain electrode, and a source wiring are formed on the first insulation film, and a second insulation film is formed thereon. An organic resin film is formed on the second insulation film, and a pixel transmission electrode connected to the drain electrode, the second auxiliary capacitance electrode, and the source wiring through a contact hole is formed on the organic resin film. A pixel reflection electrode is formed in a part or all of the pixel transmission electrode and the organic resin film. The organic resin film in the terminal part has a film thickness adjusting area thinner than the organic resin film of the pixel part.

8 Claims, 6 Drawing Sheets

DISPLAY DEVICE AND METHOD HAVING PIXEL AND TERMINAL PARTS WHERE AN ORGANIC RESIN FILM DISPOSED THEREON HAS A FILM THICKNESS ADJUSTING AREA SO THAT THE TERMINAL PART FILM THICKNESS IS THINNER THAN THE PIXEL PART FILM THICKNESS

BACKGROUND OF THE INVENTION

1. Field of the Invention

The present invention relates to a reflective liquid crystal display device or a transflective liquid crystal display device reflecting a light that is incident from an outside to display an image and a method of manufacturing the same.

2. Description of the Related Art

A development of a thin display device such as a liquid crystal display device and EL display device employing a thin film transistor (TFT) has been advancing. A liquid crystal display (LCD), which is one of flat panel displays used in place of a cathode ray tube (CRT), has the advantages of being thin and of low power consumption. For this reason, the liquid crystal display is mainly used in a notebook computer, a car navigation system, a mobile terminal device, and a television, for example. In a typical electro-optic element using liquid crystals, a liquid crystal layer is arranged between substrates having opposed electrodes with each other. A polarizing plate is formed in an outside of the substrates.

A LCD includes a transmissive LCD, a reflective LCD, and a transflective LCD or a partially reflective LCD. The transmissive LCD displays an image by transmitting light from a backlight which is a light source. The reflective LCD does not have a backlight and displays an image by reflecting the light which is incident from an outside. The transflective LCD or the partially reflective LCD uses both transmissive and reflective methods. Since the reflective LCD does not require the backlight, it is possible to reduce power consumption and to make the device thinner. Therefore, the reflective LCD has been frequently used as LCD for portable terminals. The transflective LCD, which has the advantage of both the reflective LCD and the transmissive LCD, makes it possible to prevent degradation of visibility due to the brightness difference between the light incident from the outside and the display light.

When a reflection plate of the display device of the reflective LCD is flat, background of the display device may be reflected on the display since the reflection plate functions as a mirror surface, which degrades visibility. In order to improve visibility, it is preferable to form convex parts or concave parts in the reflection plate so as to focus indirect reflected light from surrounding walls of the reflective LCD in addition to a fluorescent light and sunlight and to reflect the focused light on eyes of a user. For example, the reflection plate having the convex parts or the concave parts is formed by locally etching a metallic thin film having high reflectance ratio so as to focus the reflected light.

In the recent reflective LCD or transflective LCD, a structure of forming a reflecting electrode formed by a metal having light reflectivity on an insulating base film has been frequently used in order to improve aperture ratio or to form the convex or concave parts in the reflecting electrode which is the pixel (see Japanese Unexamined Patent Application Publication No. 2001-305515, for example). A photosensitive organic resin film, especially a photosensitive acrylic resin is often used as the insulating base film since patterning can be easily performed.

In a process of forming the reflecting electrode as above, an amine type removing liquid is used, for example, when the photoresist used for patterning the reflecting electrode is removed and cleaned. In this case, the photosensitive organic resin film which is a base film of the reflecting electrode is swelled by the amine type removing liquid. To be more specific, a gate wiring electrode, an ohmic contact film, and a source electrode and the like are formed below the photosensitive organic resin film, for example. The film thickness of the photosensitive organic resin film is different depending on places. Therefore, swelling volume of the organic resin film is different depending on the places, which leads to film floating and film peeling of the organic resin film. The film floating and film peeling of the photosensitive organic resin film is apparent in the terminal part, for example, where the reflecting electrode is not formed on the photosensitive organic resin film. Note that the terminal part is a part other than the pixel part.

A semiconductor device or the like decreasing swelling of the photosensitive organic resin film is disclosed in Japanese Unexamined Patent Application Publication Nos. 11-133627 (Nohara et al.), 2003-318402 (Muranaka), 2000-147534 (Ochi et al.). Nohara et al. discloses a method of manufacturing the semiconductor device using a resist film removing composition comprising 50 to 90% by weight of an alkanolamine having 3 or more carbon atoms, 8 to 40% by weight of a water-miscible solvent, and 2 to 30% by weight of water. Muranaka discloses a method of manufacturing a semiconductor device substrate decreasing swelling of a photosensitive organic resin film by irradiating the surface of the organic resin film with plasma. Ochi et al. discloses a display device where two layers of metal films that are reflecting electrodes formed on the organic insulation film are formed and a protective metal film formed at the lower side is etched using a reflection metal film formed at the upper side as a mask. When the resist formed on the reflection metal film is removed, the protective metal film is formed on the organic insulation film, and an amine type removing liquid is not applied on the photosensitive organic insulation film.

However, in the method of manufacturing the semiconductor device disclosed in Nohara et al., there is a need to introduce new equipment for preparing the resist film removing composition as above, which increases the cost for manufacturing the semiconductor device. Further, in the method of manufacturing the semiconductor device substrate disclosed in Muranaka, the number of manufacturing processes is increased for plasma processing. Furthermore, since new equipment for plasma irradiation needs to be introduced, the manufacturing cost increases. In the display device disclosed in Ochi et al., since two metal films need to be formed as the reflecting electrodes, the number of manufacturing processes increases and manufacturing of the display device can be complicated.

SUMMARY OF THE INVENTION

The present invention has been made to overcome such problems. One of the objects of the present invention is to provide a display device reducing film floating and film peeling, and a manufacturing method thereof.

A display device according to one aspect of the present invention includes a first auxiliary capacitance electrode and a first gate electrode wiring formed in a pixel part on a substrate, and a second auxiliary capacitance electrode and a second gate electrode wiring formed in a terminal part on the substrate, a first insulation film formed on the first auxiliary capacitance electrode, the second auxiliary capacitance electrode, the first gate electrode wiring, and the second gate electrode wiring, a source electrode formed in a part of an area opposed to the first gate electrode wiring of the pixel part on the first insulation film, a drain electrode formed in other part of the area opposed to the first gate electrode wiring and in an area opposed to the first auxiliary capacitance electrode, and a source wiring formed at a position other than the area opposed to the second auxiliary capacitance electrode of the terminal part, a second insulation film formed on the source electrode, the drain electrode, and the source wiring, an organic resin film formed on the second insulation film, the organic resin film having a film thickness adjusting area where the film on the terminal part is thinner than the film on the pixel part, a pixel transmission electrode formed on the organic resin film and connected to the drain electrode, the second auxiliary capacitance electrode, and the source wiring through a contact hole, and a pixel reflection electrode formed in a part or all of the pixel transmission electrode and the organic resin film.

A display device according to another aspect of the present invention includes a first auxiliary capacitance electrode and a first gate electrode wiring formed in a pixel part on a substrate, and a second auxiliary capacitance electrode and a second gate electrode wiring formed in a terminal part on the substrate, a first insulation film formed on the first auxiliary capacitance electrode, the second auxiliary capacitance electrode, the first gate electrode wiring, and the second gate electrode wiring, a source electrode formed in a part of an area opposed to the first gate electrode wiring of the pixel part on the first insulation film, a drain electrode formed in other part of the area opposed to the first gate electrode wiring and in an area opposed to the first auxiliary capacitance electrode, and a source wiring formed at a position other than the area opposed to the second auxiliary capacitance electrode of the terminal part, a second insulation film formed on the source electrode, the drain electrode, and the source wiring, an organic resin film formed on the second insulation film, the organic resin film having a film thickness adjusting area arranged so as to make a film thickness of the organic resin film of the terminal part substantially constant, a pixel transmission electrode formed on the organic resin film and connected to the drain electrode, the second auxiliary capacitance electrode, and the source wiring through a contact hole, and a pixel reflection electrode formed in a part or all of the pixel transmission electrode and the organic resin film.

A method of manufacturing a display device according to a further aspect of the present invention includes forming a first auxiliary capacitance electrode and a first gate electrode wiring in a pixel part on a substrate, and forming a second auxiliary capacitance electrode and a second gate electrode wiring in a terminal part on the substrate, forming a first insulation film on the first auxiliary capacitance electrode, the second auxiliary capacitance electrode, the first gate electrode wiring, and the second gate electrode wiring, forming a source electrode in a part of an area opposed to the first gate electrode wiring of the pixel part on the first insulation film, forming a drain electrode in other part of the area opposed to the first gate electrode wiring and in an area opposed to the first auxiliary capacitance electrode, and forming a source wiring at a position other than the area opposed to the second auxiliary capacitance electrode of the terminal part, forming a second insulation film on the source electrode, the drain electrode, and the source wiring, forming an organic resin film on the second insulation film, the organic resin film having a film thickness adjusting area where the film on the terminal part is thinner than the film on the pixel part, forming a pixel transmission electrode on the organic resin film, the pixel transmission electrode being connected to the drain electrode, the second auxiliary capacitance electrode, or the source wiring through a contact hole, and forming a pixel reflection electrode in a part of the pixel transmission electrode and the organic resin film.

A method of manufacturing a display device according to a further aspect of the present invention includes forming a first auxiliary capacitance electrode and a first gate electrode wiring in a pixel part on a substrate, and forming a second auxiliary capacitance electrode and a second gate electrode wiring in a terminal part on the substrate, forming a first insulation film on the first auxiliary capacitance electrode, the second auxiliary capacitance electrode, the first gate electrode wiring, and the second gate electrode wiring, forming a source electrode in a part of an area opposed to the first gate electrode wiring of the pixel part on the first insulation film, forming a drain electrode in other part of the area opposed to the first gate electrode wiring and in an area opposed to the first auxiliary capacitance electrode, and forming a source wiring at a position other than the area opposed to the second auxiliary capacitance electrode of the terminal part, forming a second insulation film on the source electrode, the drain electrode, and the source wiring, forming an organic resin film on the second insulation film, the organic resin film having a film thickness adjusting area arranged so as to make a film thickness of the organic resin film of the terminal part substantially constant, forming a pixel transmission electrode on the organic resin film, the pixel transmission electrode being connected to the drain electrode, the second auxiliary capacitance electrode, or the source wiring through a contact hole and forming a pixel reflection electrode in a part of the pixel transmission electrode and the organic resin film.

According to the display device and the manufacturing method thereof of the present invention, it is possible to reduce film floating and film peeling.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1:
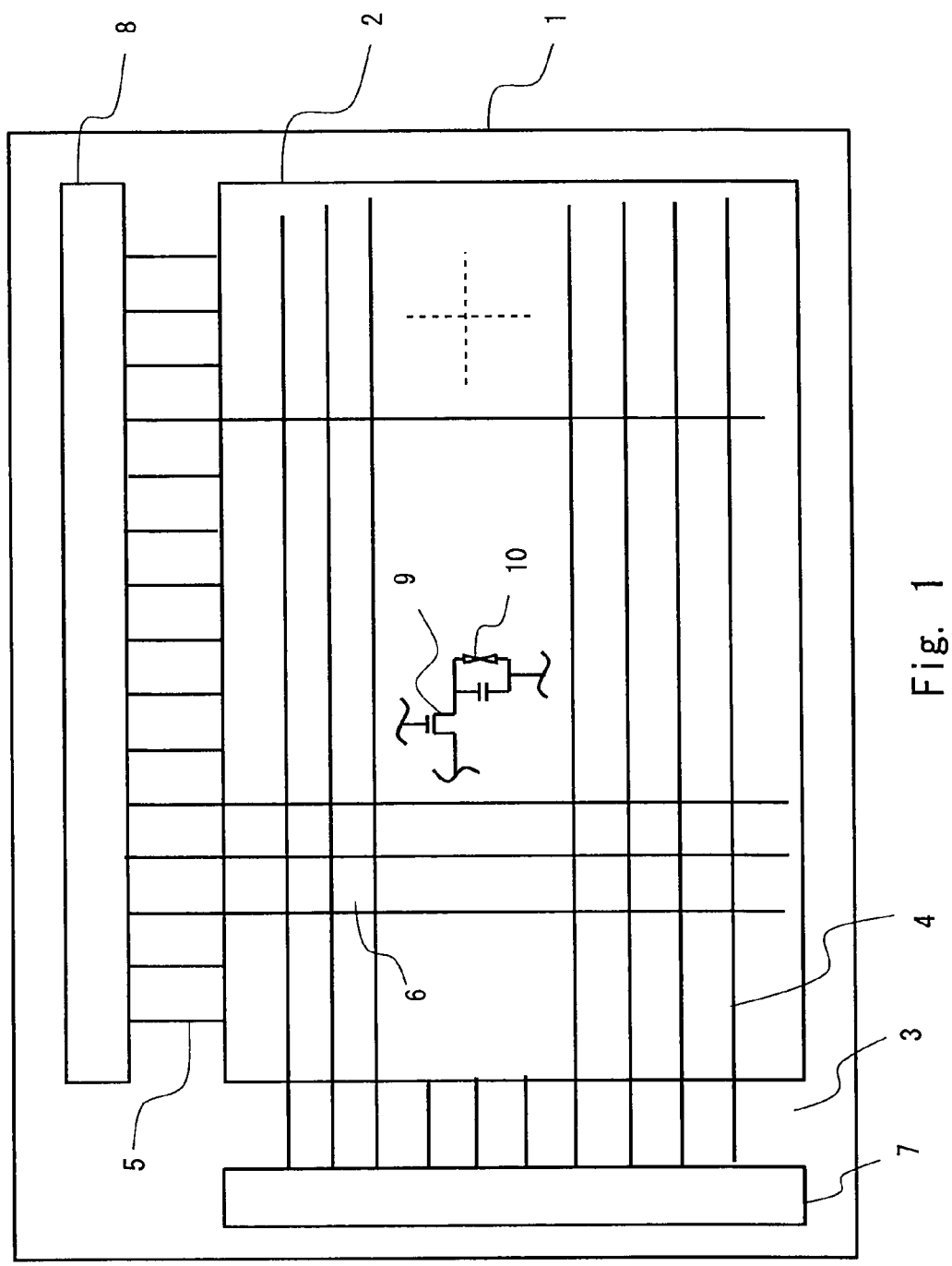
FIG. 1 shows a schematic plane view showing a structure of a TFT array substrate used in a display device according to the present embodiment.

The specific embodiment to which the present invention is applied will now be described in detail with reference to the drawings. In this embodiment, the present invention is applied to a transflective liquid crystal display device displaying an image by reflecting light that is incident from an outside. The liquid crystal display device according to the present embodiment includes a TFT array substrate. Now, a structure of the TFT array substrate of the display device according to the present embodiment will be described with reference to FIG. 1. FIG. 1 is a schematic plane view showing a structure of a TFT array substrate 1 used in the display device according to the present embodiment.

As shown in FIG. 1, the TFT array substrate 1 includes a display area 2, and a frame area 3 arranged so as to surround the display area 2. A plurality of gate electrode wirings 4 and a plurality of source wirings 5 are formed in the display area 2. The plurality of gate electrode wirings 4 are arranged in parallel with each other. Similarly, the plurality of source wirings 5 are arranged in parallel with each other. The gate electrode wirings 4 and the source wirings 5 are perpendicular to each other. The areas surrounded by the gate electrode wirings 4 and the source wirings 5 are pixels 6. The pixels 6 are arranged in matrix on the TFT array substrate 1.

Further, a gate signal driving circuit 7 and a source signal driving circuit 8 are arranged in the frame area 3 of the TFT array substrate 1. The gate electrode wirings 4 and the source wirings 5 are extended from the display area 2 to the frame area 3. The gate electrode wirings 4 are connected to the gate signal driving circuit 7 at the end of the TFT array substrate 1. An external wiring (not shown) is formed in the vicinity of the gate signal driving circuit 7 and is connected to the gate signal driving circuit 7. The source wirings 5 are connected to the source signal driving circuit 8 at the end of the TFT array substrate 1. Similarly, an external wiring (not shown) is formed in the vicinity of the source signal driving circuit 8 and is connected to the source signal driving circuit 8.

There are formed at least one TFT 9 and a auxiliary capacity part 10 in the pixel 6. The TFT 9 is formed in the vicinity of an area where the gate electrode wiring 4 and the source wiring 5 cross with each other. The auxiliary capacity part 10 is connected to the TFT 9 in series.

Figure 2A:
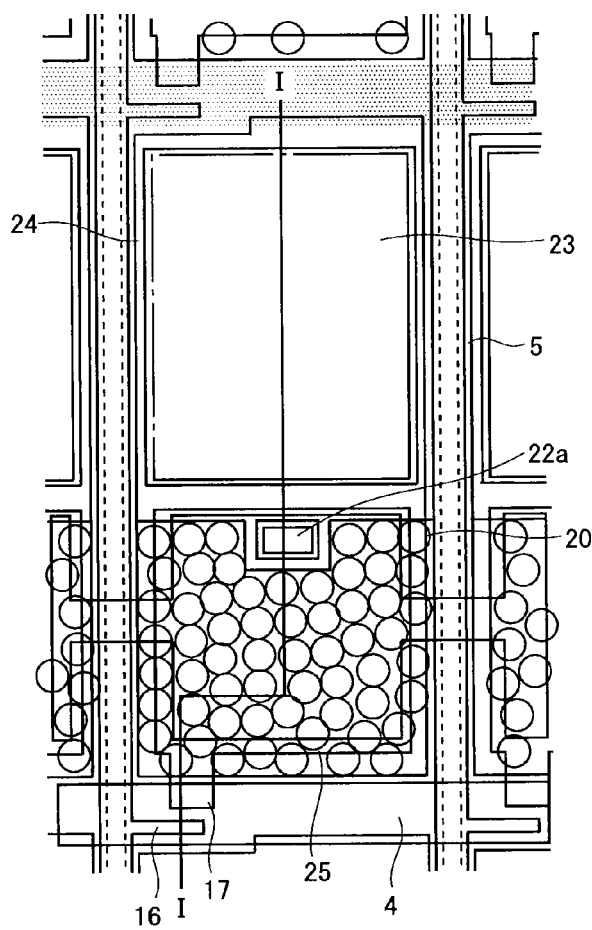
FIG. 2A is a plane view showing a structure of a pixel part of the TFT array substrate according to the present embodiment.
Figure 2B:
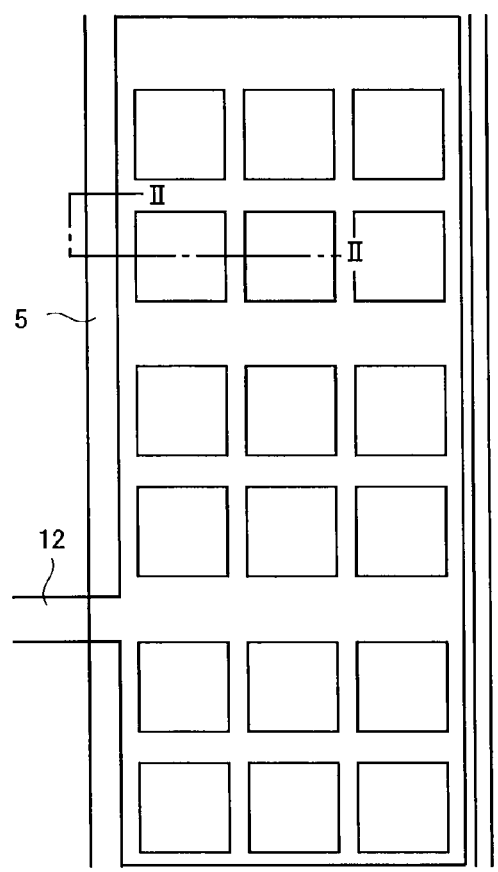
FIG. 2B is a plane view showing a structure of a terminal part of the TFT array substrate according to the present embodiment.
Figure 3:
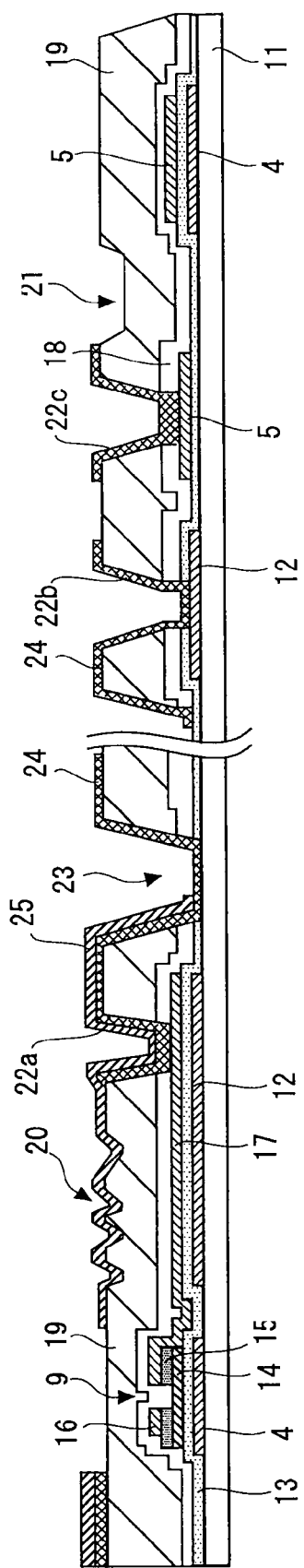
FIG. 3 shows a cross sectional view of the pixel part of the TFT array substrate taken along the line I-I of FIG. 2A and a cross sectional view of the terminal part of the TFT array substrate 1 taken along the line II-II of FIG. 2B.

The structure of the TFT array substrate 1 thus structured will now be described further in detail. FIG. 2A shows a plane view showing a structure of the pixel part of the TFT array substrate 1 according to the present embodiment. FIG. 2B shows a plane view showing a structure of the terminal part of the TFT array substrate 1. FIG. 3 shows a cross sectional view of the pixel part of the TFT array substrate 1 taken along the line I-I of FIG. 2A and a cross sectional view of the terminal part of the TFT array substrate 1 taken along the line II-II of FIG. 2B. In the display device shown in FIG. 3, the left side of the wavy lines shows the pixel part including a TFT part, a reflecting electrode part, and an aperture, and the right side of the wavy lines shows the terminal part including a Cs (auxiliary capacitance electrode) converting part, a source converting part, and a gate source cross part. The Cs converting part supplies potential of the auxiliary capacitance electrode to a color filter substrate (hereinafter referred to as CF substrate) opposed to the TFT array substrate 1. The source converting part supplies potential of the source electrode to the CF substrate, and the gate source cross part is where the gate electrode and the source electrode cross with each other.

As shown in FIGS. 2A, 2B, and 3, a gate electrode wiring 4 (first gate electrode wiring) and an auxiliary capacitance electrode 12 (first auxiliary capacitance electrode) are formed in the pixel part on the insulating substrate 11. A gate electrode wiring 4 (second gate electrode wiring) and an auxiliary capacitance electrode 12 (second auxiliary capacitance electrode) are formed in the terminal part on the insulating substrate 11. The auxiliary capacitance electrode 12 form the auxiliary capacitance for holding voltage applied to the pixel electrode for a predetermined period of time. A first insulation film 13 is formed which is a gate insulation film on the gate electrode wiring 4 and the auxiliary capacitance electrode 12. Then a semiconductor active film 14 and an ohmic contact film 15 are formed on the first insulation film 13. A source electrode 16 and a drain electrode 17 are formed on the ohmic contact film 15 in the pixel part. The source electrode 16, the drain electrode 17, and the semiconductor active film 14 are connected through the ohmic contact film 15 to form the TFT 9. A source wiring 5 connected to the source electrode 16 is formed on the first insulation film 13 in the terminal part. A second insulation film 18 is formed on the source electrode 16, the drain electrode 17, and the source wiring 5, and an organic resin film 19 is formed on the second insulation film 18. Further, concave parts 20 are formed on the organic resin film 19. In the present embodiment, a film thickness adjusting area 21 is further formed on the organic resin film 19. The details thereof will be described hereinbelow. In the pixel part, a first contact hole 22a is formed so as to penetrate through the organic resin film 19 and the second insulation film 18. In the terminal part, a contact hole 22b and a contact hole 22c are further formed. The contact hole 22b penetrates the organic resin film 19, the second insulation film 18, and the first insulation film 13. The contact hole 22c penetrates the organic resin film 19 and the second insulation film 18. Further, an aperture 23 is formed in the pixel part. A pixel transmission electrode 24 is formed on the organic resin film 19, and the pixel transmission electrode 24 is connected to the drain electrode 17 through the contact hole 22a, to the auxiliary capacitance electrode 12 through the contact hole 22b, and to the source wiring 5 through the contact hole 22c. A pixel reflection electrode 25 is formed in the concave parts 20, the contact hole 22a, and a part of the aperture 23 on the pixel transmission electrode 24.

Now, the method of manufacturing the display device shown in FIGS. 2A, 2B, and 3 will be described with reference to FIGS. 4 and 5. FIGS. 4(a) to 4(g) show a cross sectional view of a manufacturing process of the display device taken along the line I-I of FIG. 2A and the display device taken along the line II-II of FIG. 2B. In the display device shown in FIG. 4, the left side of the wavy lines shows the pixel part and the right side of the wavy lines shows the terminal part.

As shown in FIG. 4(a), a first metal film is formed on the insulating substrate 11 such as a glass substrate by a sputtering method or the like. Then a resist is applied on the first metal film, and the first metal film is patterned by a first photolithography exposing and developing the applied resist so as to form the gate electrode wiring 4 and the auxiliary capacitance electrode 12 for forming the electric capacity. The first metal film is formed by chrome (Cr), aluminum (Al), molybdenum (Mo), tantalum (Ta), titanium (Ti), tungsten (W), and copper (Cu), or alloy where a small amount of impurities are added to these metals, for example. The first metal film may be a stacked film where these metals or alloy are stacked. The film thickness is preferably about 100 nm to 500 nm. In the present embodiment, Cr film having film thickness of about 200 nm is formed as the first metal film, and the Cr film is patterned by the first photolithography. Then wet etching is performed using chemicals including cerium ammonium nitrate and perchlorate, for example, so as to form the gate electrode wiring 4 and the auxiliary capacitance electrode 12.

Then as shown in FIG. 4(b), the first insulation film 13 is formed on the gate electrode wiring 4 and the auxiliary capacitance electrode 12. In the pixel part, the semiconductor active film 14 and the ohmic contact film 15 are successively formed on the first insulation film 13. The first insulation film 13 forms SiN or SiO2 having a film thickness of about 50 nm to 400 nm. The semiconductor active film 14 forms amorphous silicon (a-Si) or polysilicon (p-Si) having a film thickness of about 100 nm to 250 nm. The ohmic contact film 15 forms n+a-Si where a small amount of phosphorus (P) is doped into the silicon so that the ohmic contact film 15 has a film thickness of about 20 nm to 70 nm. Then a resist (not shown) is applied on the ohmic contact film 15, and the resist is patterned by a second photolithography. Then the ohmic contact film 15 and the semiconductor active film 14 are etched off, and the resist is removed. The patterning of the ohmic contact film 15 and the semiconductor active film 14 is thus performed. In the present embodiment, SiN film having a film thickness of about 100 nm is formed as the first insulation film 13, a-Si film having a film thickness of about 150 nm is formed as the semiconductor active film 14, and n+a-Si film having a film thickness of about 30 nm is formed as the ohmic constant film 15 by a plasma CVD method. Note that all of them are successively formed. Then the pattern of the TFT 9 of the pixel part is formed by the second photolithography. The etching of the ohmic contact film 15 and the semiconductor active film 14 is performed by a dry etching method using a gas including halogen element, for example.

As shown in FIG. 4(c), a second metal film is formed on the first insulation film 13 and the ohmic contact film 15 by a sputtering method, for example. The second metal film is formed by Cr, Mo, Ta, Ti, W, or alloy where a small amount of impurities are added to these metals, for example. When material having low resistance is used such as Al or Cu, it is preferable to form Cr, Mo, Ta, Ti, W or the like at the lower layer of the second metal film formed by the material having low resistance as the stacked film in order to obtain great electric characteristic with the ohmic contact film 15 which is formed below the second metal film. The film thickness of the second metal film is preferably about 100 to 500 nm. Then the resist is applied and the resist is patterned by a third photolithography. Then the exposing second metal film is etched off. Accordingly, the source electrode 16 and the drain electrode 17 of the TFT 9 are formed in the pixel part, and the source wiring 5 is formed in the terminal part. Then the exposing ohmic contact film 15 and the resist are removed.

Here, Cr film having a film thickness of about 200 nm is formed as the second metal film, and the resist is patterned by the third photolithography. Hence, the source wiring 5 is formed in the terminal part, and the source electrode 16 and the drain electrode 17 of the TFT 9 are formed in the pixel part. The Cr film is formed by wet etching using chemicals including cerium ammonium nitrate and perchlorate. Then the exposing ohmic contact film 15 is removed by dry etching.

Then as shown in FIG. 4(d), a second insulation film 18 composed of SiN is formed on the source wiring 5, the source electrode 16, and the drain electrode 17 by the plasma CVD method, for example, so that the second insulation film 18 has a film thickness of about 10 nm to 150 nm. Then the organic resin film 19 formed by the organic resin is formed on the second insulation film 18 so that the organic resin film 19 has a film thickness of about 2.5 µm to 4.0 µm. The organic resin film 19 is formed so that the surface thereof is substantially flat. The material of the organic resin is preferably the one such that the surface after the organic resin film 19 is formed becomes flat.

For example, the organic resin film 19 is formed by a method of removing a base film after the organic resin formed in layer on the base film made of PET (polyethylene terephthalate) is transferred to the substrate, or a method of discharging the organic resin film from a nozzle onto the substrate and coating the substrate with the organic resin film by a spin method. The organic resin film 19 includes photosensitive organic resin or non-photosensitive organic resin. In the present embodiment, the photosensitive organic resin is used. Such a photosensitive organic resin includes PC335 or PC403 manufactured by JSR, for example. In the present embodiment, PC335 manufactured by JSR is formed by a spin method so as to have film thickness of about 2.5 µm to 3.9 µm. A positive-type organic resin film 19 is used in this embodiment. In the positive-type organic resin film, light reaches deeper part of the organic resin film and decreased amount of the film thickness due to the development increases as the light intensity in exposure becomes higher. In other words, as the light intensity in exposure becomes higher, the film thickness of the organic resin film 19 that remains after the development process decreases.

As shown in FIG. 4(e), exposure and development are performed on the organic resin film 19 by locally changing volume of light sensed by the organic resin film 19 so as to form the contact hole 22 (contact holes 22a to 22c) and the aperture 23 in the organic resin film 19. Then a plurality of concave parts 20 are formed in the area where the pixel reflection electrode 25 is formed on the organic resin film 19. Further, in the present embodiment, the film thickness adjusting area 21 is formed between the gate source cross part and the source converting part.

In order to form the contact hole 22, the aperture 23, the concave parts 20, and the film thickness adjusting area 21, a mask for forming the contact hole 22 and the aperture 23 and a mask for forming the concave parts 20 and the film thickness adjusting area 21 are used in exposing the organic resin film 19. This exposure is performed by changing light volumes with each other. The mask for forming the concave parts 20 and the film thickness adjusting area 21 has a pattern less than a resolution of the exposure device in the area where the concave parts 20 and the film thickness adjusting area 21 are formed. Accordingly, by employing the mask having the pattern less than the resolution, the pattern is blurred and exposure amount decreases in the area where the pattern less than the resolution is formed. For example, when the resolution is about 50%, substantially half the organic resin film 19 is removed compared with the case where the resolution is 100%. Accordingly, it is possible to form the area having substantially half the depth compared with the case where the resolution is 100%. By performing exposure through the mask having the pattern less than the resolution, exposure amount decreases in the area having large film thickness (the area where the concave parts 20 and the film thickness adjusting area 21 are formed). Then in the development process, a part of the area having large film thickness is removed in accordance with the film thickness of the area having small film thickness (other than the area where the concave parts 20 and the film thickness adjusting area 21 are formed) so as to form the concave parts 20 and the film thickness adjusting area 21. The mask for forming the concave parts 20 and the film thickness adjusting area 21 almost completely shades other areas than the area where the concave parts 20 and the film thickness adjusting area 21 are formed and has the pattern in the area where the concave parts 20 and the film thickness adjusting area 21 are formed. By employing such a mask, light is illuminated on the concave parts 20 and the film thickness adjusting area 21 in the exposure process, and the area on which the light is illuminated is removed in the development process. Hence, the concave parts 20 and the film thickness adjusting area 21 are formed. It is therefore possible to focus indirect reflected light from the surrounding walls of the display device and to improve visibility by employing the plurality of concave parts 20.

The organic resin film 19 swells by a resist removing liquid used in the patterning of the pixel reflection electrode 25 which is formed later on the organic resin film 19, and film floating and film peeling occur. The film floating and the film peeling occur since the stress that is added when the organic resin film 19 swells is different depending on places due to step parts formed below the organic resin film 19. To be more specific, the number of layers of the gate electrode wiring and the auxiliary capacitance electrode formed on the insulating substrate 11 is different depending on the places, and the step parts are formed due to the difference in the number of layers. Therefore, the film thickness of the organic resin film 19 formed on the step parts is different depending on the places, and the stress added to the organic resin film 19 in swelling varies. For example, two layers of the gate electrode wiring 4 and the source wiring 5 are formed below the organic resin film 19 in the gate source cross part of the terminal part. On the other hand, only one layer of the source wiring 5 is formed below the organic resin film 19 in the source converting part of the terminal part. Therefore, there are step parts below the organic resin film 19 in the source converting part and the gate source cross part of the terminal part. Accordingly, swelling volume difference in the organic resin film 19 due to the removing liquid is generated by these step parts and the film floating and film peeling occur. The film floating and film peeling occur especially in the terminal part where the pixel reflection electrode 25 is not formed. This is because the area where the resist removing liquid contacts the organic resin film 19 is small in the pixel part since the pixel reflection electrode 25 is formed on the organic resin film 19. In the present embodiment, a film thickness adjusting area 21 is formed in a part of the organic resin film 19 in accordance with the film thickness of the plurality of films that are formed below the organic resin film 19 to make the film thickness of the organic resin film 19 constant in order to reduce the film floating and film peeling of the organic resin film 19. Since the film thickness of the organic resin film 19 is made substantially constant, stress is almost evenly added when the organic resin film 19 swells, which makes it possible to reduce swelling volume difference in the organic resin film 19 due to the removing liquid. Accordingly, the film floating and film peeling can be reduced.

Figure 5:
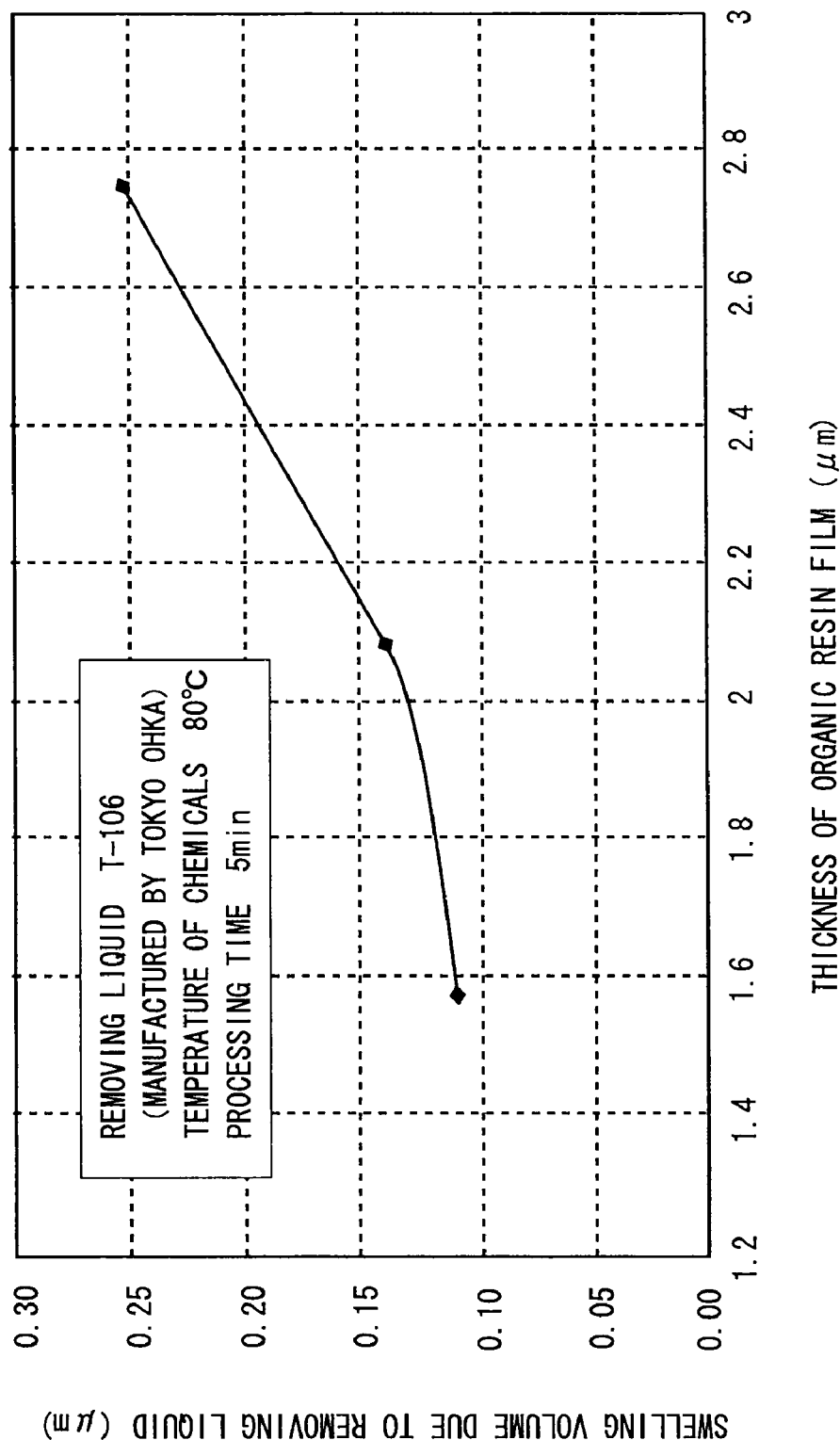
FIG. 5 is a diagram showing a relation between film thickness and swelling volume of an organic resin film.

FIG. 5 shows a relation between film thickness and swelling volume of the organic resin film 19 when the resist removing liquid is used at a certain temperature (80° C., for example) for a predetermined period of time (five minutes, for example) in forming the pixel transmission electrode 24. A horizontal axis in FIG. 5 shows the film thickness (μm) of the organic resin film 19, and a vertical axis shows the swelling volume (μm) of the organic resin film 19 due to the resist removing liquid. Here, PC335 manufactured by JSR is used as the organic resin film 19, and T-106 manufactured by Tokyo Ohka is used as the resist removing liquid. As shown in FIG. 5, the swelling volume of the organic resin film 19 due to the resist removing liquid increases as the film thickness of the organic resin film 19 increases. Hence, it can be understood that the stress due to the swelling increases as the film thickness difference is large, and the stress due to the swelling can be made substantially constant as the film thickness difference is small.

Referring back to FIG. 4(e), after forming the concave parts 20, the film thickness adjusting area 21, the contact hole 22, and the aperture 23 in the organic resin film 19, the second insulation film 18 formed at the bottom of the contact hole 22a, and the second insulation film 18 and the first insulation film 13 formed at the bottom of the aperture 23 are removed in the pixel part by a dry etching method using a gas including fluorine element. Further, the first insulation film 13 and the second insulation film 18 formed at the bottom of the contact hole 22b, and the second insulation film 18 and the first insulation film 13 formed at the bottom of the contact hole 22c are removed in the Cs converting part of the terminal part.

Then as shown in FIG. 4(f), a transparent conductive film is formed at a predetermined area on the organic resin film 19. In the present embodiment, an ITO film is formed so as to have the film thickness of about 5 to 15 nm. Then, the transparent conductive film is patterned by a fifth photolithography to form the pixel transmission electrode 24. Accordingly, the pixel transmission electrode 24 formed at the contact hole, the drain electrode 17, the gate electrode wiring 4, and the source wiring 5 are connected. Further, the pixel transmission electrode 24 is connected to the insulating substrate 11 through the aperture 23.

Then as shown in FIG. 4(g), a third metal film is formed on the organic resin film 19 and the pixel transmission electrode 24 by a sputtering method. The organic resin film 19 includes the area where the concave parts 20 are formed and the area where they are not formed. The concave parts 20 are formed in the third metal film by forming the third metal film on the organic resin film 19 including the concave parts 20. Then the third metal film is patterned by a sixth photolithography. Accordingly, the pixel reflection electrode 25 is formed on the concave parts 20 of the organic resin film 19 and a part of the aperture 23. The organic resin film 19 is swelled by the resist removing liquid that is used when the resist used in patterning of the pixel reflection electrode 25 is removed. In the present embodiment, as stated above, the film thickness adjusting area 21 is formed so that the film thickness of the organic resin film 19 becomes substantially constant. Hence, the film floating and film peeling due to the swelling of the organic resin film 19 can be prevented.

Since the third metal film is the pixel reflection electrode 25 which also functions as the pixel electrode and the reflection plate in the pixel part, the third metal film is preferably made by the material having high reflectance ratio. For example, the third metal film is composed of Al or Ag having reflectance ratio property of 90% or more in the visible light of a wavelength of 550 nm or alloy where a small amount of impurities are added to these metals. The film thickness is preferably about 50 to 400 nm, and more preferably about 100 nm or more so as to prevent failure such as disconnection which may be caused by the steps in the concave parts of the pixel part and to maximize the reflectance property. Furthermore, the pixel reflection electrode 25 may have stacked structure where a metallic thin film of Cr, Mo, Ta, Ti, W or the like is formed below the pixel reflection electrode 25 in order to improve adhesiveness of the pixel reflection electrode 25 and to improve the contact property with the pixel transmission electrode 24 that is formed below the pixel reflection electrode 25. In the present embodiment, the third metal film forms Al film having a film thickness of about 300 nm, for example. Hence, the TFT array substrate 1 is formed.

As described above, in the present embodiment, the film thickness adjusting area 21 is formed in a part of the organic resin film 19, for example, to make the film thickness of the organic resin film 19 substantially constant. The film thickness adjusting area 21 is formed between the source part and the gate source cross part of the terminal part, for example. This film thickness adjusting area 21 is formed in accordance with the steps of the plurality of films that are formed below the organic resin film 19. By forming the film thickness adjusting area 21 and making the film thickness of the organic resin film 19 substantially constant, the stress added when the organic resin film 19 is swelled by the resist removing liquid used for forming the pixel reflection electrode 25 on the organic resin film 19 can be reduced. Hence, the film floating and film peeling of the organic resin film 19 can be reduced.

Although the film thickness adjusting area 21 is formed between the gate source cross part and the source converting part of the terminal part as an example in this embodiment, the film thickness adjusting area 21 can also be formed between the source converting part and the gate part of the terminal part. Further, although the film thickness adjusting area 21 is formed in order to make the film thickness of the organic resin film 19 substantially constant as an example in this embodiment, the Cs converting part, the source converting part, and the gate source cross part of the terminal part may be formed on the insulating substrate 11 in an island shape. In summary, the organic resin film 19, the second insulation film 18, and the first insulation film 13 that are formed among the Cs converting part, the source converting part, and the gate source cross part are removed to expose the insulating substrate 11 among the Cs converting part, the source converting part, and the gate source cross part. Hence, the stress added when the organic resin film 19 swells by the resist removing liquid in the source converting part, the Cs converting part, and the gate source cross part can be reduced, which makes it possible to reduce the film peeling and film floating of the organic resin film 19.

Second Embodiment

Figure 6:
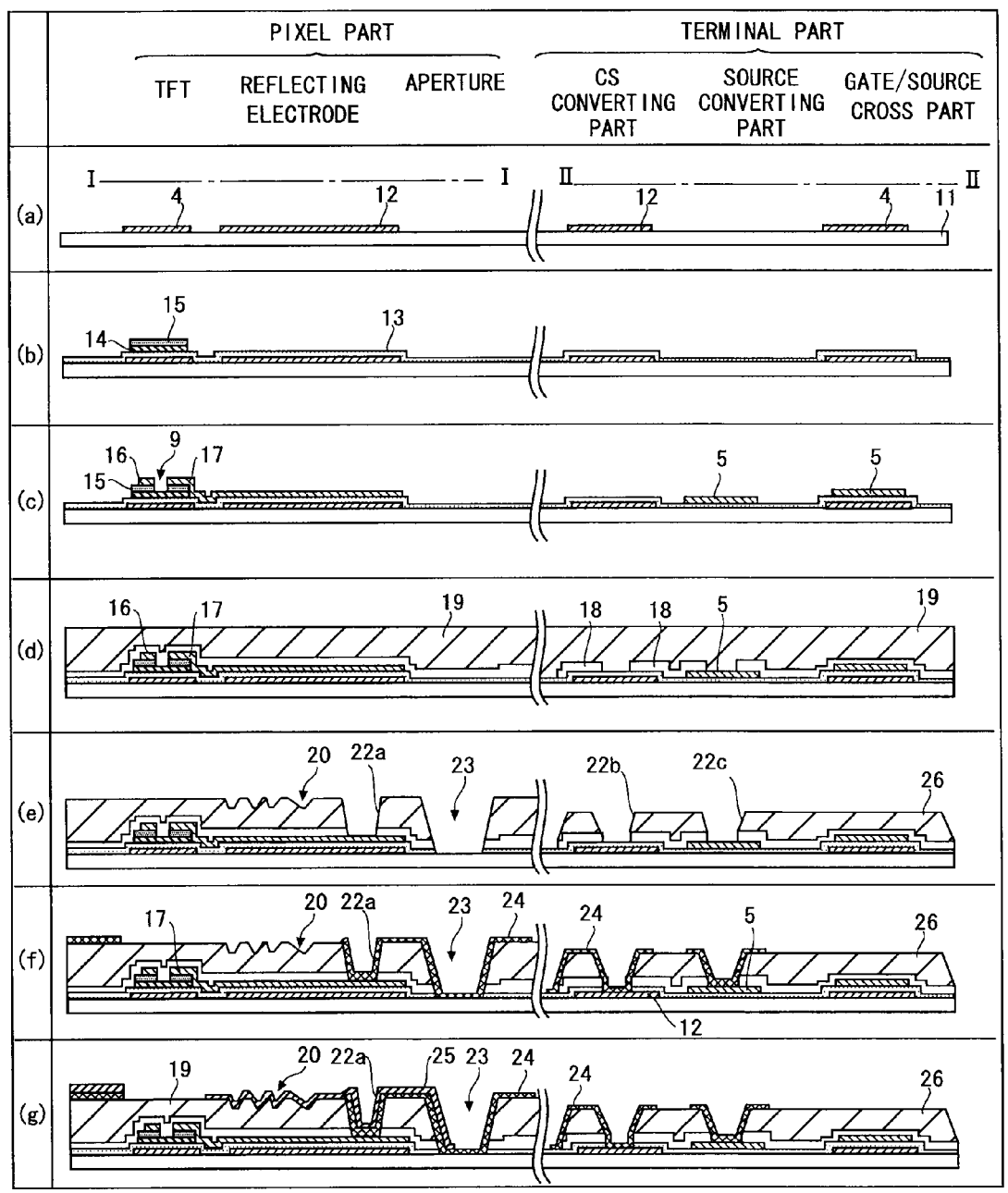
FIG. 6 is a cross sectional view of a manufacturing process of a display device according to a second embodiment.

The display device according to the second embodiment will be described with reference to FIG. 6. FIG. 6 is a cross sectional view of the manufacturing process of the display device according to the second embodiment. In the display device according to the second embodiment shown in FIG. 6, the same components as those of the first embodiment in FIG. 4 are denoted by like reference symbols, and the description thereof will be omitted.

Figure 4:
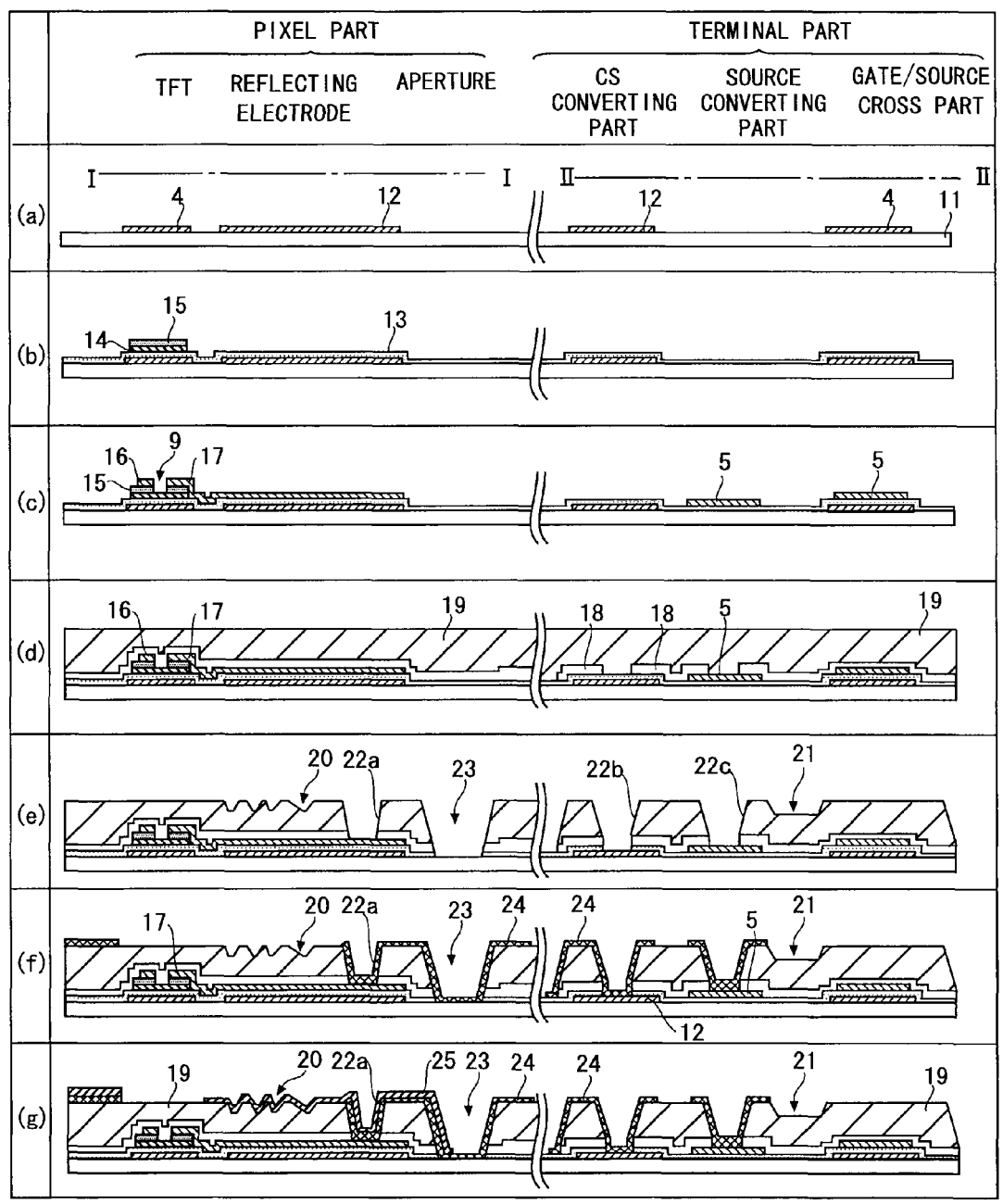
FIG. 4 is a cross sectional view of a manufacturing process of a display device according to a first embodiment.

In the display device according to the second embodiment shown in FIGS. 6(*a*) to 6(*d*), the second insulation film 18 is formed on the source wiring 5, the source electrode 16, and the drain electrode 17, and the organic resin film 19 composed of the organic resin is formed on the second insulation film 18 as in the first embodiment shown in FIGS. 4(*a*) to 4(*d*). In the first embodiment, the film thickness of the organic resin film 19 is made substantially constant by forming the film thickness adjusting area 21, which makes it possible to reduce the film peeling and film floating of the organic resin film 19. On the other hand, in the present embodiment, as shown in FIG. 6(*e*), the organic resin film 19 of the terminal part where the swelling of the organic resin film 19 is apparent is made thinner than the organic resin film 19 of the pixel part. Here, the organic resin film 19 of the terminal part which is thinner than the film of the pixel part is called thin-layered resin film 26. The thin-layered resin film 26 will be described hereinafter in detail.

The film thickness of the organic resin film 19 in the pixel part and the film thickness of the organic resin film 19 in the terminal part can be made different from each other as follows. First, as shown in FIG. 6(*d*), the organic resin film 19 is formed on the whole surface of the substrate. Then a mask for forming the contact hole 22 and the aperture 23 and a mask for forming the concave parts 20 and the thin-layered resin film 26 are used in exposing the organic resin film 19. The exposure is performed by changing light volumes with each other. As in the first embodiment, the mask for forming the concave parts 20 and the thin-layered resin film 26 has a pattern less than a resolution of the exposure device in the area where the concave parts 20 and the thin-layered resin film 26 are formed, for example. Accordingly, by employing the mask having the pattern less than the resolution to perform exposure and development, the thin-layered resin film 26 that is thinner than the organic resin film 19 in the pixel part can be formed in the terminal part. In this case, the thin-layered resin film 26 may have thickness of 2 μm or less, for example. The mask for forming the concave parts 20 and the thin-layered resin film 26 almost completely shades other areas than the area where the concave parts 20 and the thin-layered resin film 26 are formed and has the pattern in the area where the concave parts 20 and the thin-layered resin film 26 are formed. Further, in the process of forming the organic resin film 19 shown in FIG. 6(*d*), for example, the organic resin film 19 formed in the pixel part and the terminal part can be formed in a separate process. To be more specific, the organic resin film 19 having a desired thickness may be formed only in the pixel part in a first process, and then the organic resin film 19 having a desired thickness may be formed in the pixel part and the terminal part in a second process. Accordingly, the organic resin film 19 is formed in the pixel part and the thin-layered resin film 26 is formed in the terminal part. The thin-layered resin film 26 in the terminal part can be formed thinner than the organic resin film 19 in the pixel part.

In the present embodiment, the thin-layered resin film 26 which is the organic resin film 19 formed in the terminal part is made thinner than the organic resin film 19 formed in the pixel part. Accordingly, it is possible to reduce swelling of the organic resin film 19 due to the resist removing liquid when the pixel reflection electrode 25 is formed on the organic resin film 19. This is because the swelling volume is large when the film thickness is large, as shown in FIG. 5 showing the relation between the film thickness and the swelling volume of the organic resin film 19. Accordingly, it is possible to reduce the swelling of the organic resin film 19 and to reduce the film floating and film peeling of the organic resin film 19 by reducing the film thickness of the organic resin film 19 in the terminal part.

The present invention is not limited to the above embodiments but can be variously changed without departing from the scope of the present invention. For example, although the positive material is used as the photosensitive organic resin film in the present embodiments, the negative-type photosensitive resin film may also be used. Further, although the exposure is performed here by changing light volume using the mask of the exposure for forming the contact hole 22 and the aperture 23 and the mask of the exposure for forming the concave parts 20 and the film thickness adjusting area 21 or the thin-layered resin film 26, the concave parts 20, the aperture 23, the contact hole 22, the film thickness adjusting area 21 or the thin-layered resin film 26 may be formed by one exposure using a single mask. In this case, it is preferable to form the relatively thin metal film having film thickness of about 50 nm or less on the concave parts 20 and the film thickness adjusting area 21 or the thin-layered resin film 26 so that the light transmittance of the mask pattern of the concave parts 20 and the film thickness adjusting area 21 or the thin-layered resin film 26 is smaller than the light transmittance of the mask pattern of the contact hole 22 and the aperture 23, whereby the transmittance can be reduced.

Although the present invention is applied to the transflective liquid crystal display in the embodiments, the present invention may also be applied to the reflective liquid crystal display. In this case, the aperture 23 and the pixel transmission electrode 24 may not be formed. Therefore, after forming the concave parts 20, the contact hole 22, and the film thickness adjusting area 21 in the organic resin film 19, the second insulation film 18 exposed at the bottom of the contact hole 22 is removed. Then the third metal film is formed so as to be connected to the drain electrode 17 through the contact hole 22. Then the pixel reflection electrode 25 is formed on the concave parts 20. The third metal film may have stacked structure. For example, a refractory metal film may be formed in a lower layer of the third metal film, and Al alloy film may be formed in an upper layer of the third metal film.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A display device comprising:
   a first auxiliary capacitance electrode and a first gate electrode wiring formed in a pixel part on a substrate, and a second auxiliary capacitance electrode and a second gate electrode wiring formed in a terminal part on the substrate;
   a first insulation film formed on the first auxiliary capacitance electrode, the second auxiliary capacitance electrode, the first gate electrode wiring, and the second gate electrode wiring;
   a source electrode formed in a part of an area opposed to the first gate electrode wiring of the pixel part on the first insulation film, a drain electrode formed in another part of the area opposed to the first gate electrode wiring and in an area opposed to the first auxiliary capacitance electrode, and a source wiring formed at a position other than the area opposed to the second auxiliary capacitance electrode of the terminal part;
   a second insulation film formed on the source electrode, the drain electrode, and the source wiring;
   an organic resin film formed on the second insulation film, the organic resin film including a film thickness adjusting area where the film on the terminal part is thinner than the film on the pixel part;
   a pixel transmission electrode formed on the organic resin film and connected to the drain electrode, the second auxiliary capacitance electrode, and the source wiring through a contact hole; and
   a pixel reflection electrode formed in a part or all of the pixel transmission electrode and the organic resin film, wherein
   the film thickness adjusting area is located on the terminal part and adjusts a maximum thickness of the organic resin film on the terminal part to be thinner than a maximum thickness of the organic resin film on the pixel part.

2. A display device comprising:
   a first auxiliary capacitance electrode and a first gate electrode wiring formed in a pixel part on a substrate, and a second auxiliary capacitance electrode and a second gate electrode wiring formed in a terminal part on the substrate;
   a first insulation film formed on the first auxiliary capacitance electrode, the second auxiliary capacitance electrode, the first gate electrode wiring, and the second gate electrode wiring;
   a source electrode formed in a part of an area opposed to the first gate electrode wiring of the pixel part on the first insulation film, a drain electrode formed in another part of the area opposed to the first gate electrode wiring and in an area opposed to the first auxiliary capacitance electrode, and a source wiring formed at a position other than the area opposed to the second auxiliary capacitance electrode of the terminal part;
   a second insulation film formed on the source electrode, the drain electrode, and the source wiring;
   an organic resin film formed on the second insulation film, the organic resin film including a film thickness adjusting area arranged so as to make a film thickness of the organic resin film of the terminal part substantially constant;
   a pixel transmission electrode formed on the organic resin film and connected to the drain electrode, the second auxiliary capacitance electrode, and the source wiring through a contact hole; and
   a pixel reflection electrode formed in a part or all of the pixel transmission electrode and the organic resin film, wherein
   the film thickness adjusting area is a concave region disposed in an upper surface of the organic resin film of the terminal part.

3. The display device according to claim 1, wherein a plurality of concave parts are arranged on the organic resin film of the pixel part.

4. The display device according to claim 2, wherein a plurality of concave parts are arranged on the organic resin film of the pixel part.

5. The display device according to claim 2, wherein the film thickness adjusting area is disposed in a region of the terminal part where the number of underlying layers is less than the number of underlying layers of other regions of the terminal part.

6. A method of manufacturing a display device comprising:
   forming a first auxiliary capacitance electrode and a first gate electrode wiring in a pixel part on a substrate, and forming a second auxiliary capacitance electrode and a second gate electrode wiring in a terminal part on the substrate;
   forming a first insulation film on the first auxiliary capacitance electrode, the second auxiliary capacitance electrode, the first gate electrode wiring, and the second gate electrode wiring;
   forming a source electrode in a part of an area opposed to the first gate electrode wiring of the pixel part on the first insulation film, forming a drain electrode in another part of the area opposed to the first gate electrode wiring and in an area opposed to the first auxiliary capacitance electrode, and forming a source wiring at a position other than the area opposed to the second auxiliary capacitance electrode of the terminal part;
   forming a second insulation film on the source electrode, the drain electrode, and the source wiring;

forming an organic resin film on the second insulation film, the organic resin film including a film thickness adjusting area where the film on the terminal part is thinner than the film on the pixel part;

forming a pixel transmission electrode on the organic resin film, the pixel transmission electrode being connected to the drain electrode, the second auxiliary capacitance electrode, or the source wiring through a contact hole; and forming a pixel reflection electrode in a part of the pixel transmission electrode and the organic resin film, wherein the film thickness adjusting area is located on the terminal part and adjusts a maximum thickness of the organic resin film on the terminal part to be thinner than a maximum thickness of the organic resin film on the pixel part.

7. A method of manufacturing a display device comprising:

forming a first auxiliary capacitance electrode and a first gate electrode wiring in a pixel part on a substrate, and forming a second auxiliary capacitance electrode and a second gate electrode wiring in a terminal part on the substrate;

forming a first insulation film on the first auxiliary capacitance electrode, the second auxiliary capacitance electrode, the first gate electrode wiring, and the second gate electrode wiring;

forming a source electrode in a part of an area opposed to the first gate electrode wiring of the pixel part on the first insulation film, forming a drain electrode in another part of the area opposed to the first gate electrode wiring and in an area opposed to the first auxiliary capacitance electrode, and forming a source wiring at a position other than the area opposed to the second auxiliary capacitance electrode of the terminal part;

forming a second insulation film on the source electrode, the drain electrode, and the source wiring;

forming an organic resin film on the second insulation film, the organic resin film including a film thickness adjusting area arranged so as to make a film thickness of the organic resin film of the terminal part substantially constant;

forming a pixel transmission electrode on the organic resin film, the pixel transmission electrode being connected to the drain electrode, the second auxiliary capacitance electrode, or the source wiring through a contact hole; and forming a pixel reflection electrode in a part of the pixel transmission electrode and the organic resin film, wherein the film thickness adjusting area is a concave region disposed in an upper surface of the organic resin film of the terminal part.

8. The method according to claim 7, wherein the film thickness adjusting area is disposed in a region of the terminal part where the number of underlying layers is less than the number of underlying layers of other regions of the terminal part.

* * * * *